United States Patent
Otsubo

(10) Patent No.: US 9,523,859 B2
(45) Date of Patent: Dec. 20, 2016

(54) VOLUMETRIC-IMAGE FORMING SYSTEM AND METHOD THEREOF

(71) Applicant: ASUKANET COMPANY, LTD., Hiroshima-shi, Hiroshima (JP)

(72) Inventor: Makoto Otsubo, Hiroshima (JP)

(73) Assignee: ASUKANET COMPANY, LTD., Hiroshima-shi (JP)

( * ) Notice: Subject to any disclaimer, the term of this patent is extended or adjusted under 35 U.S.C. 154(b) by 93 days.

(21) Appl. No.: 14/378,181

(22) PCT Filed: Feb. 7, 2013

(86) PCT No.: PCT/JP2013/052873
§ 371 (c)(1),
(2) Date: Aug. 12, 2014

(87) PCT Pub. No.: WO2013/129063
PCT Pub. Date: Sep. 6, 2013

(65) Prior Publication Data
US 2015/0062700 A1 Mar. 5, 2015

(30) Foreign Application Priority Data
Feb. 28, 2012 (JP) .................. 2012-041978

(51) Int. Cl.
*G02B 27/22* (2006.01)
*G03B 35/24* (2006.01)
*H04N 13/04* (2006.01)

(52) U.S. Cl.
CPC ....... *G02B 27/2292* (2013.01); *G02B 27/2278* (2013.01); *G02B 27/2285* (2013.01); *G03B 35/24* (2013.01); *H04N 13/0495* (2013.01)

(58) Field of Classification Search
CPC ..... G02B 5/136; G02B 27/2278; G03B 21/60; F21V 11/00
(Continued)

(56) References Cited

U.S. PATENT DOCUMENTS 4,741,595 A 5/1988 Onoda et al.
4,853,769 A 8/1989 Kollin
(Continued)

FOREIGN PATENT DOCUMENTS

CN 1280302 A 1/2001
EP 1 070 976 A2 1/2001
(Continued)

OTHER PUBLICATIONS

International Search Report dated May 21, 2013 issued in corresponding application No. PCT/JP2013/052873.
(Continued)

*Primary Examiner* — Audrey Y Chang
(74) *Attorney, Agent, or Firm* — Westerman, Hattori, Daniels & Adrian, LLP

(57) ABSTRACT

A volumetric-image forming system comprises an optical image-forming means 15 and a volumetric display apparatus 17, the optical image-forming means 15 having light-transmitting and plate-like first and second reflecting members 13 and 14 respectively provided with belt-like first and second reflecting surfaces 11 and 12, the first and second reflecting surfaces 11 and 12 being arranged perpendicular to a plate surface and in parallel at a constant pitch, the first and second reflecting surfaces further being arranged crossing one another, the volumetric display apparatus 17 being arranged in the back side of the optical image-forming means 15 and displaying a luminous volumetric image A in a resting or dynamic state inside a display apparatus 16 from electronic data, whereby a volumetric image A inside the display apparatus 16 is formed as a volumetric image B in a free space in the front side of the optical image-forming means 15.

3 Claims, 6 Drawing Sheets

(58) Field of Classification Search
USPC ... 359/479, 459, 449; 362/325, 342; 349/66; 345/6; 353/10, 71

See application file for complete search history.

(56) References Cited

U.S. PATENT DOCUMENTS

| | | | |
|---|---|---|---|
| 6,466,185 B2* | 10/2002 | Sullivan | G02B 27/2278 345/4 |
| 7,443,583 B2* | 10/2008 | Yamauchi | G03B 21/60 359/449 |
| 8,730,308 B2* | 5/2014 | Maekawa | G02B 5/136 348/51 |
| 8,867,136 B2* | 10/2014 | Hashikawa | G02B 17/006 353/10 |
| 2004/0191548 A1 | 9/2004 | Takemoto | |
| 2004/0263976 A1 | 12/2004 | Harata et al. | |
| 2008/0285127 A1 | 11/2008 | Ochi | |
| 2009/0310231 A1 | 12/2009 | Maekawa | |
| 2010/0002319 A1 | 1/2010 | Maekawa | |
| 2010/0195055 A1 | 8/2010 | Maekawa | |
| 2010/0231860 A1 | 9/2010 | Maekawa | |
| 2011/0181949 A1 | 7/2011 | Hashikawa | |
| 2012/0081788 A1 | 4/2012 | Maekawa et al. | |
| 2012/0287125 A1 | 11/2012 | Liu | |
| 2013/0082904 A1 | 4/2013 | Nakai et al. | |

FOREIGN PATENT DOCUMENTS

| | | | |
|---|---|---|---|
| EP | 2 180 365 A1 | 4/2010 |
| JP | 51-44186 A | 4/1976 |
| JP | 58-021702 A | 2/1983 |
| JP | 60-110445 A | 6/1985 |
| JP | 61-25104 A | 2/1986 |
| JP | 63-191182 A | 8/1988 |
| JP | 2-167502 A | 6/1990 |
| JP | 06-160770 A | 6/1994 |
| JP | 07-56112 A | 3/1995 |
| JP | 09-005503 A | 1/1997 |
| JP | 11-23812 A | 1/1999 |
| JP | 11-211915 A | 8/1999 |
| JP | 2004-295045 A | 10/2004 |
| JP | 2005-500578 A | 1/2005 |
| JP | 2005-59382 A | 3/2005 |
| JP | 2005-173546 A | 6/2005 |
| JP | 2007-178775 A | 7/2007 |
| JP | 2007-206427 A | 8/2007 |
| JP | 2008-102278 A | 5/2008 |
| JP | 2008-158114 A | 7/2008 |
| JP | 2009-25621 A | 2/2009 |
| JP | 2010-132532 A | 6/2010 |
| JP | 2010-170606 A | 8/2010 |
| JP | 2011-081296 A | 4/2011 |
| JP | 2011-081300 A | 4/2011 |
| JP | 2011-081309 A | 4/2011 |
| JP | 2011-90117 A | 5/2011 |
| JP | 2011-175297 A | 9/2011 |
| JP | 2012-14194 A | 1/2012 |
| JP | 4865088 B2 | 2/2012 |
| JP | 2012-128456 A | 7/2012 |
| JP | 2012-155345 A | 8/2012 |
| JP | 2013-73204 A | 4/2013 |
| JP | 2013-127625 A | 6/2013 |
| JP | 2015-90387 A | 5/2015 |
| WO | 03/017246 A1 | 2/2003 |
| WO | 2007/116639 A1 | 10/2007 |
| WO | 2008041616 A1 | 4/2008 |
| WO | 2009/017134 A1 | 2/2009 |
| WO | 2009/131128 A1 | 10/2009 |
| WO | 2009/136578 A1 | 11/2009 |
| WO | 2010/131622 A1 | 11/2010 |
| WO | 2011/091660 A1 | 8/2011 |

OTHER PUBLICATIONS

International Search Report dated Dec. 10, 2013 issued in application No. PCT/JP2013/080288 (2 pages).

International Search Report dated Aug. 13, 2013, issued in application No. PCT/JP2013/064372 (2 pages).

International Search Report dated Feb. 14, 2012 issued in application No. PCT/JP2012/051087 (1 page).

Japanese Decision to Grant a Patent dated Aug. 21, 2012, issued in Japanese Patent Application No. 2009-242789 (3 pages).

Non-Final Office Action dated Oct. 23, 2015, issued in U.S. Appl. No. 14/352,616 (26 pages).

Notification of Reasons for Refusal dated Apr. 21, 2015, issued in Japanese patent application No. 2014-545773, with English translation (6 pages).

Notification of Reasons for Refusal dated Aug. 18, 2015, issued in Japanese Patent Application No. 2014-545773, with English translation (6 pages).

Satoshi Maekawa et al., "Advances in Passive Imaging Elements with Micromirror Array," National Institute of Information and Communications Technology, 3-5 Hikaridai, Seika-cho, Soraku-gun, Kyoto, Japan; Kobe University, 1-1 Rokkodai-cho, Nada-ku, Kobe, Japan, SPIE-IS&T vol. 6803 68030B-1 © 2008 SPIE-IS&T (12 pages).

Supplementary European Search Report dated May 29, 2015, issued in counterpart European Patent Application No. 12842760.6 (5 pages).

Japanese Notification of Reasons for Refusal mailed May 15, 2012, issued in corresponding Japanese Patent Application No. 2009-242789, w/ partial English translation (6 pages).

Notification of Reasons for Refusal mailed Oct. 1, 2014 issued in Taiwanese Patent Application No. 102106259 (5 pages).

Notice of Allowance dated Dec. 13, 2013, issued in U.S. Appl. No. 13/361,597 (now U.S. Pat. No. 3,702,252) (20 pages).

Non-Final Office Action dated Jan. 7, 2016, issued in U.S. Appl. No. 14/405,690 (11 pages).

Extended European Search Report dated Jan. 4, 2016 issued in EP application No. 13800976.6 (8 pages).

Final Office Action dated Apr. 6, 2016, issued in U.S. Appl. No. 14/352,616 (22 pages).

Notice of Allowance dated Jul. 29, 2016, issued in U.S. Appl. No. 14/352,616 (9 pages).

European Search Report dated May 9, 2016, issued in European Patent Application No. 13854159.4 (9 pages).

Chinese First Notice of Reasons for Refusal dated Jun. 3, 2016, issued in Chinese Patent Application No. 201380053517.0, w/ English translation (14 pages).

Final Office Action dated Jul. 1, 2016, issued in U.S. Appl. No. 14/405,690 (15 pages).

Japanese Notification of Reasons for Refusal dated Aug. 2, 2016, issued in Japanese Patent Application No. 2015-118473, with English translation (6 pages).

Non-Final Office Action dated Sep. 7, 2016, issued in U.S. Appl. No. 14/429,695 (35 pages).

* cited by examiner

VOLUMETRIC-IMAGE FORMING SYSTEM AND METHOD THEREOF

TECHNICAL FIELD

The present invention relates to a volumetric-image forming system for forming a volumetric image in a free space (in an actual living space) and a method for forming a volumetric image.

BACKGROUND ART

Until now, there have been proposals of devices and methods for the visual confirmation of volumetric images through 2D (two-dimensional) images formed inside a display apparatus, however, visual fields in which the volumetric images can be visually confirmed are narrow, and there are problems such as a need for special glasses for the visual confirmation of volumetric images.

Therefore, for example, in Patent Literature 1, a system for displaying a volumetric image directly in a space (a physically deep space) inside a display apparatus and a method thereof are proposed. Since this volumetric image is formed from electronic data, there is no limitation on an obtained volumetric image, enabling an observer to see an image based on the position where the observer views the image from. For example, the right side of an image can be visually confirmed when the image is viewed from the right, and there is also an advantage of being able to look inside from above.

Moreover, for example, in Patent Literatures 2 and 3, devices which use an actual object and display a real image (volumetric image) thereof in a free space and methods thereof are disclosed. This volumetric image is formed in a free space, therefore, there is no limitation in the size of the volumetric image (e.g., a volumetric image equal in size to an object can be displayed), and there is an advantage of being able to touch the volumetric image with hands as well (in actuality, volumetric images are unsubstantial and hands will slip through).

CITATION LIST

Patent Literature

Patent Literature 1: Japanese Unexamined Patent Application Publication (Translation of PCT Application) No. 2005-500578

Patent Literature 2: Japanese Unexamined Patent Application Publication No. 2011-175297

Patent Literature 3: Japanese Unexamined Patent Application Publication No. 2011-090117

SUMMARY OF INVENTION

Technical Problem

However, according to Patent Literature 1, since a volumetric image is displayed in a space inside the display apparatus, the size of the volumetric image becomes limited and there is a problem of not being able to directly touch the volumetric image with hands.

On the other hand, according to Patent Literatures 2 and 3, it is necessary to have an object as a basis of a volumetric image in order to obtain a volumetric image, thus there is a limitation on the obtained volumetric image and the volumetric image goes into a resting state, which causes a problem of not being able to obtain a volumetric image in a dynamic state.

The present invention has been made in view of the above circumstances, and an object thereof is to provide a volumetric-image forming system capable of forming a volumetric image in a resting state or dynamic state in a free space from electronic data, and also to provide a method thereof.

Solution to Problem

In order to achieve the above object, according to a first invention, there is provided a volumetric-image forming system comprising an optical image-forming means and a volumetric display apparatus, the optical image-forming means having light-transmitting and plate-like first and second reflecting members arranged closely or in direct contact with one another, the first and second reflecting members respectively having belt-like first and second reflecting surfaces arranged perpendicular to a plate surface and also arranged in parallel at a constant pitch, the first and second reflecting surfaces further being arranged crossing one another, the volumetric display apparatus being arranged in the back side of the optical image-forming means and displaying a luminous volumetric image A in a resting or dynamic state inside a display apparatus from electronic data, wherein the volumetric image A inside the display apparatus is formed as a volumetric image B in a free space in the front side of the optical image-forming means.

In order to achieve the above object, according to a second invention, there is provided a volumetric-image forming system comprising an optical image-forming apparatus and a volumetric display apparatus, the optical image-forming apparatus having light-transmitting and plate-like first and second reflecting members arranged closely or in direct contact with one another, the first and second reflecting members respectively having belt-like first and second reflecting surfaces arranged perpendicular to a plate surface and also arranged in parallel at a constant pitch, the optical image-forming apparatus having a plurality of optical image-forming means positioned on the same surface, the plurality of optical image-forming means having the first and second reflecting surfaces arranged at a constant pitch, the first and second reflecting surfaces being orthogonal to one another, wherein one of the bisectors of intersection angles where the opposed first and second reflecting surfaces cross in planar view in the respective optical image-forming means are gathered at one point, the volumetric display apparatus being arranged in the back side of the optical image-forming apparatus and displaying a luminous volumetric image A in a resting or dynamic state inside a display apparatus from electronic data, wherein the volumetric image A inside the display apparatus is formed as a volumetric image B in a free space in the front side of the optical image-forming apparatus.

In the volumetric-image forming systems according to the first and second inventions, it is preferred that each of the first and second reflecting members be an N-layered structure composed of two or more layers. It is also preferred that the positions of the first and second reflecting surfaces in the respective first and second reflecting members adjacent in planar view be shifted by 1/N of the pitch between the first reflecting surfaces and between the second reflecting surfaces.

In the volumetric-image forming systems according to the first and second inventions, the volumetric display apparatus comprises a projector portion and the display apparatus, the projector portion projecting images by transforming image signals formed from electronic data into images, the display apparatus having electronic screens displaying the images and arranged in the projection direction of the images with a distance between each electronic screen, wherein the electronic screens are capable of electronic control (i.e., selection control of light between transmitting state and scattering state performed electrically) to select the state of light between transmitting state and scattering state and can be arranged in a direction parallel or orthogonal to the optical image-forming means.

In order to achieve the above object, according to a third invention, there is provided a method for forming a volumetric image, comprising the steps of: providing an optical image-forming means with light-transmitting and plate-like first and second reflecting members and belt-like first and second reflecting surfaces, the light-transmitting and plate-like first and second reflecting members being arranged closely or in direct contact with one another, the first and second reflecting members respectively having the belt-like first and second reflecting surfaces arranged perpendicular to a plate surface and also arranged in parallel at a constant pitch, the first and second reflecting surfaces further being arranged crossing one another; and arranging a volumetric display apparatus in the back side of the optical image-forming means, the volumetric display apparatus displaying a luminous volumetric image A in a resting or dynamic state inside a display apparatus from electronic data, whereby the volumetric image A inside the display apparatus is formed as a volumetric image B in a free space in the front side of the optical image-forming apparatus. Additionally, in the first through third inventions above, it is preferred that a background of the volumetric image B be black color, however, in the case of superimposing the volumetric image B on the background, an alternate image (a volumetric image or planar image) can be used as the background.

Advantageous Effects of Invention

In the volumetric-image forming system according to the first invention and the method for forming a volumetric image according to the third invention, when, among lights emitted from the volumetric image A, those entering from the back side of the optical image-forming means are reflected on the first reflecting surfaces, further re-reflected on the second reflecting surfaces arranged crossing the first reflecting surfaces and pass through to the front side of the optical image-forming means, the reflected lights having passed through the optical image-forming means and incident lights entering from the back side of the optical image-forming means become parallel to one another in planar view. Therefore, among lights radially-emitted from a point of the volumetric image A, those reflected on the individually different first and second reflecting surfaces and passing through the optical image-forming means consequently become focused in a free space in the front side of the optical image-forming means, enabling the image formation of a volumetric image B in a free space (i.e., a volumetric image A inside the display apparatus can be extracted as a volumetric image B in a free space which can be directly touched with hands).

In the volumetric-image forming system according to the second invention, among lights emitted from a volumetric image A, when those entering from the back side of the optical image-forming apparatus are reflected on the first reflecting surfaces, further re-reflected on the second reflecting surfaces arranged crossing the first reflecting surfaces and pass through to the front side of the optical image-forming apparatus, the reflected lights having passed through the optical image-forming apparatus and incident lights entering from the back side of the optical image-forming apparatus become parallel to one another in planar view. Therefore, among lights radially-emitted from a point of the volumetric image A, those reflected on the individually different first and second reflecting surfaces and passing through the optical image-forming apparatus consequently become focused in a free space in the front side of the optical image-forming apparatus, enabling the image formation of a volumetric image B in a free space (i.e., a volumetric image A inside the display apparatus can be extracted as a volumetric image B in a free space which can be directly touched with hands).

Moreover, when the first and second reflecting surfaces are arranged at a constant pitch and a plurality of optical image-forming means in which the first and second reflecting surfaces are arranged orthogonal to one another are arranged side by side on the same surface, one of the bisectors of planarly-viewed intersection angles of the first and second reflecting surfaces included in the respective optical image-forming means are gathered at one point. Thus, in each optical image-forming means, the ratio of lights reflected only once on either the first or second reflecting surface and passing through the optical image-forming means to those reflected on each of the first and second reflecting surfaces and passing through the optical image-forming means can be decreased, which prevents a mirror image of a volumetric image A reflected on the first or second reflecting surface from being superimposed on a volumetric image B and visually confirmed as a ghost or noise, and increases the brightness of the volumetric image B as well.

Furthermore, by combining a plurality of optical image-forming means, an increase in the areas of the first and second reflecting members can be achieved at a low cost, thus a volumetric-image forming system with which many observers are able to simultaneously observe a high-resolution volumetric image can be provided at a low cost.

In the volumetric-image forming systems according to the first and second inventions, when each of the first and second reflecting members is an N-layered structure of two or more layers, and the positions of the first and second reflecting surfaces adjacent in planar view are shifted by 1/N of a pitch in each of the first and second reflecting members, the pitch (spacing) between the first and second reflecting surfaces can be made 1/N of an actual pitch (pitch between the first reflecting surfaces and between the second reflecting surfaces in each layer) when the first and second reflecting members each are viewed in planar view. This enables, for example, lights emitted from a point of the volumetric image A with a small difference in emission angles thereof and those emitted from a point adjacent to the volumetric image A to be individually reflected on the first reflecting surfaces of the first reflecting member, also enables those reflected lights to be re-reflected on the second reflecting surfaces of the second reflecting member and to become focused in a free space in the front side of the optical image-forming means. A resolution improvement of the volumetric image B can be achieved accordingly.

In the volumetric-image forming systems according to the first and second inventions, when a volumetric display apparatus comprises a projector portion and a display apparatus, the projector portion projecting images by transforming image signals formed from electronic data into images, the display apparatus having electronic screens displaying the images and arranged in the projection direction of the images with a distance between each electronic screen, and the electronic screens are capable of electronic control to select the state of light between transmitting state and scattering state and arranged parallel or orthogonal to the optical image-forming means, a volumetric image A can actually be formed in three-dimensional space.

Additionally, since the volumetric image A is formed from electronic data, the volumetric image A can easily be formed in a wide variety of states.

DESCRIPTION OF EMBODIMENTS

Next, with reference to the accompanying drawings, explanations on embodiments which embody the present invention will be given hereinafter for a further understanding of the present invention.

Figure 1:
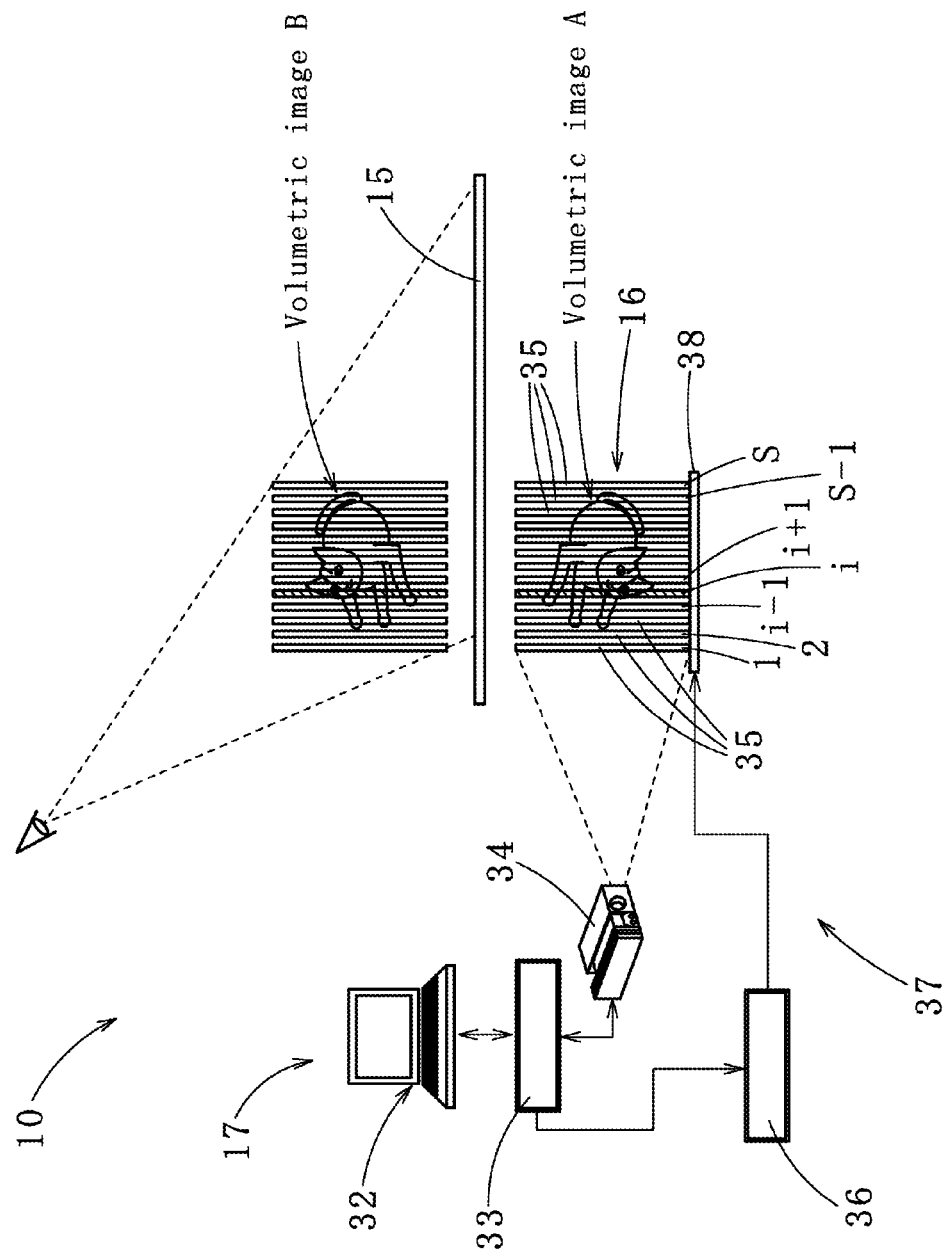
FIG. 1 is an explanatory diagram of a volumetric-image forming system according to a first embodiment of the present invention.
Figure 2:
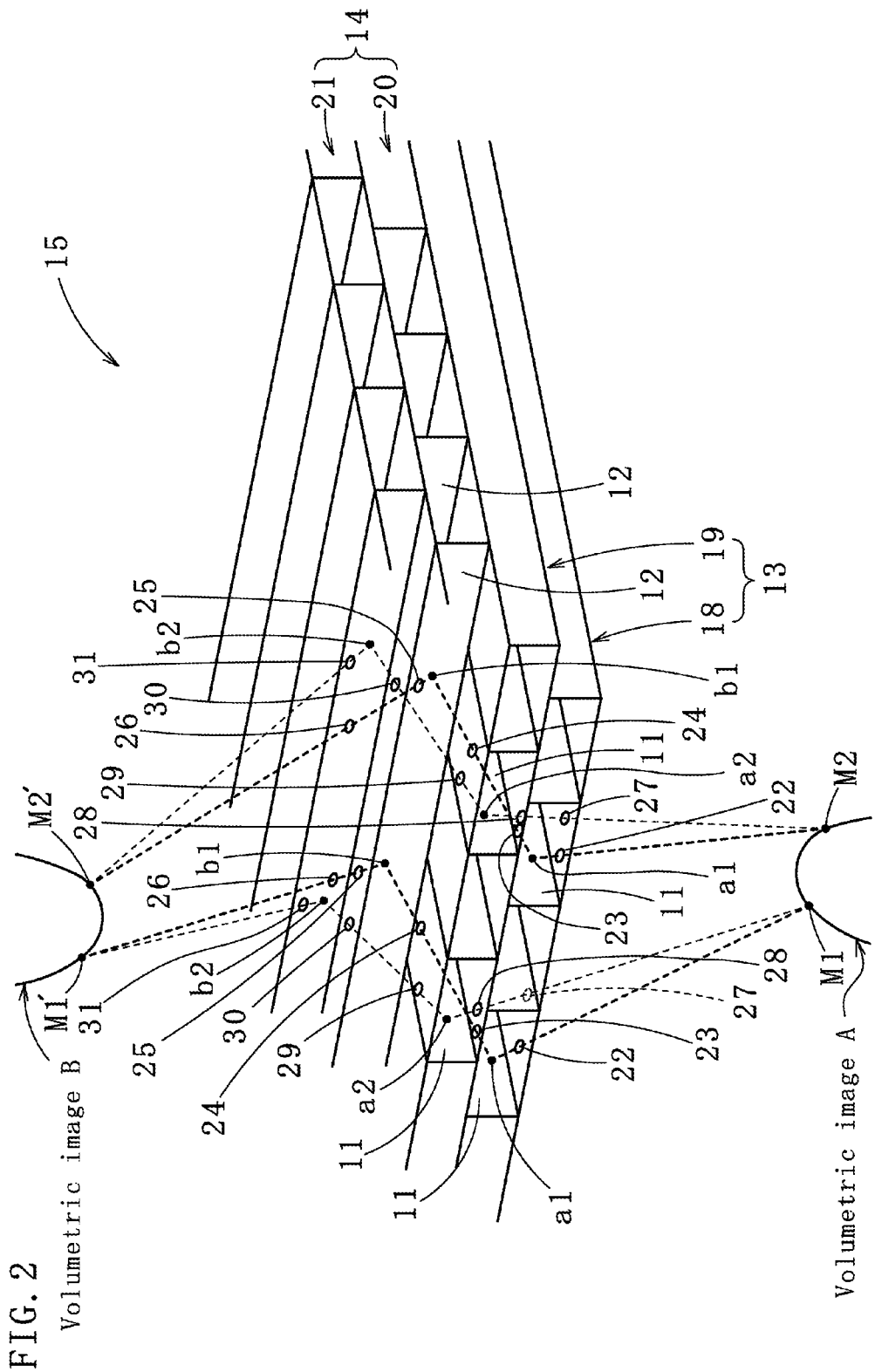
FIG. 2 is a perspective view of the volumetric-image forming system illustrating a reflection of lights by an optical image-forming means.

As illustrated in FIGS. 1 and 2, a volumetric-image forming system 10 according to a first embodiment of the present invention comprises an optical image-forming means 15 and a volumetric display apparatus 17, the optical image-forming means 15 having light-transmitting and plate-like first and second reflecting members 13 and 14 arranged in direct contact with one another, the first and second reflecting members 13 and 14 respectively having belt-like first and second reflecting surfaces 11 and 12 arranged perpendicular to a plate surface and also arranged in parallel at a constant pitch, the first and second reflecting surfaces 11 and 12 further being arranged crossing one another, for example, orthogonal to one another, the volumetric display apparatus 17 being arranged in the back side of the optical image-forming means 15 and displaying a luminous volumetric image A in a resting or dynamic state inside a display apparatus 16 from electronic data, wherein the volumetric image A inside the display apparatus 16 is formed as a volumetric image B in a free space in the front side of the optical image-forming means 15. Respective explanations are given hereunder on the optical image-forming means 15 and the volumetric display apparatus 17.

As illustrated in FIG. 2, the first reflecting member 13 composing the optical image-forming means 15 is a double-layered structure composed of two stacked first reflectors 18 and 19 (an example of an N-layered structure). The first reflecting surfaces 11 are arranged in each of the first reflectors 18 and 19 at a constant pitch, and the positions of the first reflecting surfaces 11 of the first reflector 18 and the first reflecting surfaces 11 of the first reflector 19 are shifted in parallel by just ½ of a pitch between the first reflecting surfaces 11 in planar view. Also, the second reflecting member 14 composing the optical image-forming means 15 is a double-layered structure composed of two stacked second reflectors 20 and 21. The second reflecting surfaces 12 are arranged in each of the second reflectors 20 and 21 at a constant pitch (e.g., the same pitch as that between the first reflecting surfaces 11), and the positions of the second reflecting surfaces 12 of the second reflector 20 and the second reflecting surfaces 12 of the second reflector 21 are shifted in parallel by just ½ of the pitch between the second reflecting surfaces 12 in planar view.

The first reflectors 18 and 19 of the light-transmitting first reflecting member 13 and the second reflectors 20 and 21 of the light-transmitting second reflecting member 14 are formed by transparent materials, for example, glass or transparent synthetic resins. Here, it is preferred that the glass be quartz glass and the transparent synthetic resins be acrylic resins. Moreover, since the quartz glass has a high rigidity and low thermal expansion coefficient, if the first reflectors 18 and 19 and the second reflectors 20 and 21 each are formed by using the quartz glass, misalignment and distance change of the first and second reflecting surfaces 11 and 12 each formed in the first and second reflectors 18 through 21 can be prevented even when a load is applied on the first and second reflectors 18 through 21 or with a change in temperature.

Additionally, the first and second reflecting surfaces 11 and 12 can be reflecting surfaces of, for example, metal such as aluminum and silver (e.g., metal plating layer or vapor-deposited metal layer), and if reflecting surfaces are formed by aluminum, reflecting surfaces with high reflectivity can be formed at a low cost.

The first and second reflectors 18 through 21 are made by, for example, making a laminated body by layering a plurality of transparent plates made of transparent materials with a constant thickness and having metallic reflecting surfaces formed on both upper and under sides thereof, the transparent plates being stacked with the reflecting surfaces facing each other, and cutting the laminated body so that cutout surfaces become perpendicular to each reflecting surface. The first reflecting member 13 is made by arranging the first reflectors 18 and 19 each on different levels in direct contact with one another (e.g., the first reflector 19 is arranged above the first reflector 18) so that the first reflecting surfaces 11 of the first reflector 18 and the first reflecting surfaces 11 of the first reflector 19 become parallel to one another, shifting the positions of the first reflecting surfaces 11 of the first reflector 19 by just ½ of a pitch between the first reflecting surfaces 11 with respect to the positions of the first reflecting surfaces 11 of the first reflector 18, and fixing the first reflectors 18 and 19 by using a non-illustrated binding member. Similarly, the second reflecting member 14 is made by arranging the second reflectors 20 and 21 each on different levels in direct contact with one another (e.g., the second reflector 21 is arranged above the second reflector 20) so that the second reflecting surfaces 12 of the second reflector 20 and the second reflecting surfaces 12 of the second reflector 21 become parallel to one another, shifting the positions of the second reflecting surfaces 12 of the second reflector 21 by just ½ of a pitch between the second reflecting surfaces 12 with respect to the positions of the second reflecting surfaces 12 of the second reflector 20, and fixing the second reflectors 20 and 21 by using a non-illustrated binding member.

Here, the thickness of the transparent plates corresponds to the pitch between the first reflecting surfaces 11 and between the second reflecting surfaces 12, and the thickness of the first and second reflectors 18 through 21 is determined based on a thickness at the time of being cut out from the laminated body.

The optical image-forming means 15 is made by arranging the first reflecting member 13 and second reflecting member 14 on different levels, further arranging the first reflecting surfaces 11 of the first reflecting member 13 and the second reflecting surfaces 12 of the second reflecting member 14 orthogonal to one another in planar view, and fixing the first and second reflecting members 13 and 14 to each other by using a non-illustrated binding member.

The first and second reflectors 18 through 21 can be fixed in an integrated manner as well by composing a fixing member having each effect of both binding members: one that forms the first and second reflecting members 13 and 14 by fixing the first reflectors 18 and 19 respectively on the second reflectors 20 and 21, and the other that fixes the first and second reflecting members 13 and 14 on each other.

Additionally, the optical image-forming means 15 can be formed by bonding the first and second reflectors 18 through 21 with transparent adhesive. In this case, the thickness of the adhesive needs to be one negligible with respect to the pitch between the first reflecting surfaces 11 and second reflecting surfaces 12 (e.g., ⅛₀-1/20 of the pitch).

With the optical image-forming means 15 having the above structure, as illustrated in FIG. 2, if lights emitted from two different points M1 and M2 of the volumetric image A arranged in the back side of the optical image-forming means 15 (one side of the first reflecting member 13) with a distance from the first reflecting member 13 enter from a light entrance portion 22 on a surface of one side of the first reflecting member 13 (first reflector 18), the lights entered go into the first reflector 18, being reflected at a point a1 on the first reflecting surface 11, and the reflected lights go into the first reflector 19 through a light entrance/exit portion 23 on a surface of one side of the first reflector 19 arranged on a surface of the other side of and in direct contact with the first reflector 18. Next, the reflected lights gone into the first reflector 19 pass through the first reflector 19, and go into the second reflector 20 through a light entrance/exit portion 24 on a surface of one side of the second reflector 20 arranged on a surface of the other side of and in direct contact with the first reflector 19. Then, the reflected lights gone into the second reflector 20 are re-reflected at a point b2 on the second reflecting surface 12. The re-reflected lights go into the second reflector 21 through a light entrance/exit portion 25 on a surface of one side of the second reflector 21 arranged on a surface of the other side of and in direct contact with the second reflector 20, and are emitted to the outside of the second reflecting member 14 (second reflector 21) from a light exit portion 26 on a surface of the other side of the second reflector 21.

Additionally, if different lights emitted from the two different points, M1 and M2, of the volumetric image A enter from a light entrance portion 27 on a surface of one side of the first reflecting member 13 (first reflector 18), the lights entered go into the first reflector 18 and go into the first reflector 19 through a light entrance/exit portion 28 on a surface of one side of the first reflector 19 arranged on a surface of the other side of and in direct contact with the first reflector 18. Next, the lights gone into the first reflector 19 are reflected at a point a2 on the first reflecting surface 11, the reflected lights go into the second reflector 20 through a light entrance/exit portion 29 on a surface of one side of the second reflector 20 arranged on a surface of the other side of and in direct contact with the first reflector 19, pass through the second reflector 20, and go into the second reflector 21 through a light entrance/exit portion 30 on a surface of one side of the second reflector 21 arranged on a surface of the other side of and in direct contact with the second reflector 20. Then, the reflected lights gone into the second reflector 21 are re-reflected at a point b2 on the second reflecting surface 12, and the re-reflected lights are emitted to the outside of the second reflecting member 14 (optical image-forming means 15) from a light exit portion 31 on a surface of the other side of the second reflector 21.

Here, since the first and second reflecting surfaces 11 and 12 are arranged orthogonal to one another in planar view, if incident lights having entered into the first reflecting member 13 are initially reflected at the points of a1 and a2 on the first reflecting surfaces 11, and the reflected lights are secondly reflected at the points of b1 and b2 on the second reflecting surfaces 12 of the second reflecting member 14 and emitted to the outside of the second reflecting member 14 (front side of the optical image-forming means 15) from the light entrance/exit portions 26 and 31 of the second reflector 21, the incident lights entering into the optical image-forming means 15 from the back side of the optical image-forming means 15 and the reflected lights having passed through the optical image-forming means 15 and emitted to the front side of the optical image-forming means 15 become parallel when viewing the optical image-forming means 15 in planar view. Thus, among the lights emitted from the different points, M1 and M2, of the volumetric image A arranged in the back side of the optical image-forming means 15 and entered into the optical image-forming means 15, the re-reflected lights reflected once on each of the first and second reflecting surfaces 11 and 12 in a row and emitted to the outside (front side) of the optical image-forming means 15 are individually focused at points M1' and M2' that are in a free space in the front side of the optical image-forming means 15 and symmetrical to the volumetric image A with the optical image-forming means 15 in between, forming the volumetric image B.

There have been the explanations on the case of the reflected lights reflected on the first reflecting surfaces 11 of the first reflector 18 of the first reflecting member 13 and those reflected on the first reflecting surfaces 11 of the first reflector 19 of the first reflecting member 13 respectively being re-reflected on the second reflecting surfaces 12 of the second reflector 20 of the second reflecting member 14 and on the second reflecting surfaces 12 of the second reflector 21 of the second reflecting member 14. However, in the case of reflected lights that are reflected once on the first reflecting surface 11 of any one of the first reflectors 18 and 19 of the first reflecting member 13 and secondly reflected on the second reflecting surface 12 of any one of the second reflectors 20 and 21 of the second reflecting member 14, the reflected lights can be focused at a position that is in a free space in the front side of the optical image-forming means 15 and symmetrical to the volumetric image A with the optical image-forming means 15 in between, forming the volumetric image B.

Since the volumetric image A and the volumetric image B are plane-symmetrical to each other centering on the optical image-forming means 15, a region close to the optical image-forming means 15 in the volumetric image A exists in a position close to the optical image-forming means 15 in the case of the volumetric image B, and a region far from the optical image-forming means 15 in the volumetric image A exists in a position far from the optical image-forming means 15 in the case of the volumetric image B. Thus, if the volumetric image B is viewed from the front side of the optical image-forming means 15, the concave-convex relationship of the volumetric image B is the reverse of that of the volumetric image A. Therefore, it is necessary to use two optical image-forming means 15 in a stacked state in order to obtain the volumetric image B with the same concave-convex relationship as that of the volumetric image A.

Additionally, it is necessary to adjust the thickness of the first and second reflectors 18 through 21 at the time of being cut out depending on the strengths, vertical dimensions and horizontal dimensions of the first and second reflecting members 13 and 14. For example, the thickness is 0.5-10 mm. Also, it is preferred that the thickness of the first and second reflectors 18 through 21 be in the range of 0.1- to 10-fold (preferably 0.9- to 1.1-fold, more preferably 1-fold) of the pitch between the first reflecting surfaces 11 and between the second reflecting surfaces 12. This increases the areas of the first and second reflecting surfaces 11 and 12 and ensures the amount of lights that are reflected. This also prevents the reflected lights initially reflected on the first and second reflecting surfaces 11 and 12 from the repetition of being reflected on the neighbor reflecting surfaces 11 and 12 (the first and second reflecting surfaces 11 and 12 that are respectively opposed to the first and second reflecting surfaces 11 and 12 on which the lights are initially reflected), entering into the first and second reflecting surfaces 11 and 12 on which they are initially reflected and being re-reflected again.

Since the positions of the first reflecting surfaces 11 of the first reflectors 18 and 19 are shifted by ½ of the pitch between the first reflecting surfaces 11, in the case of incident lights with a small difference in emission angles which are emitted from the same point of the volumetric image A and enter into the optical image-forming means 15, some incident lights are reflected on the first reflecting surface 11 of the first reflector 18 of the first reflecting member 13, and others are reflected on the first reflecting surface 11 of the first reflector 19 of the first reflecting member 13.

Moreover, the positions of the second reflecting surfaces 12 of the second reflectors 20 and 21 are also shifted by ½ of the pitch between the second reflecting surfaces 12. Thus, even if the difference in emission angles is small between the reflected lights reflected on the first reflecting surface 11 of the first reflector 18 and those reflected on the first reflecting surface 11 of the first reflector 19, some reflected lights are reflected on the second reflecting surface 12 of the second reflector 20 of the second reflecting member 14 while others are reflected on the second reflecting surface 12 of the second reflector 21 of the second reflecting member 14. Therefore, the volumetric image B can be generated by using the incident lights with a small difference in the emission angles which enter into the optical image-forming means 15 from the same point of the volumetric image A, and a high-resolution volumetric image can be formed.

In the first embodiment, the first reflecting member 13 is a double-layered structure composed of two stacked first reflectors 18 and 19, and the second reflecting member 14 is a double-layered structure composed of two stacked second reflectors 20 and 21. However, the first and second reflecting members can respectively be composed of one first reflector and one second reflector as well.

Additionally, each of the first and second reflecting members can be, for example, an N-layered structure composed of 3 or more but 10 or less layers. Furthermore, when the first and second reflecting members are N-layered structures, each of the first and second reflecting members must be arranged with the positions of the first and second reflecting surfaces adjacent in planar view shifted by 1/N of a pitch. With this type of structure, the pitch between the first and second reflecting surfaces of the first and second reflecting members in planar view become 1/N of a pitch between the first reflecting surfaces and between the second reflecting surfaces in the respective first and second reflectors, enabling the obtainment of a volumetric image with further enhanced resolution.

The volumetric display apparatus 17, for example, as illustrated in FIG. 1, has an image source 32, a display control part 33, and a projector portion 34, the image source 32 outputting volumetric image signals by forming them from stored electronic data, the display control part 33 forming image signals and output control signals of image signals from volumetric image signals, the projector portion 34 projecting images by transforming image signals into the images based on output control signals. Moreover, the volumetric display apparatus 17 also has a display portion 37 provided with a display apparatus 16 and a driving apparatus 36, the display apparatus 16 being composed of electronic screens 35 capable of electrically selecting the state of lights between transmitting state and scattering state (electronic control), the electronic screens 35 being arranged orthogonal to the projection direction of the projector portion 34 and further being S-layer laminated in the projection direction with some distance in between, the driving apparatus 36 selecting the state of lights in the electronic screens 35 between the transmitting state and scattering state based on the output control signals. Additionally, the electronic screens 35 are arranged in a direction orthogonal to the optical image-forming means 15.

The image source 32 can be formed, for example, by incorporating a program for graphics and an interface for performing the input/output of data and signals with the display control part 33 in a general-purpose computer provided with a data storage device. Here, the volumetric image signals output from the image source 32 are composed of, for example, three-dimensional digital image signals and depth values (e.g., Z coordinate value in the case of configuring a coordinate system in which X-axis and Y-axis being on the surfaces of the electronic screens 35 in a digital image, and the laminating direction of the electronic screens 35 being Z-axis).

The display control part 33 comprises a slice-image forming function and a restoring function, the slice-image forming function producing the image signals by generating each slice image signal corresponding to the depth value based on the three-dimensional digital image signals and depth values, the restoring function producing the output control signals which indicate the places where slice images created from the slice image signals are formed and forming volume images from the slice images. The display control part 33 can be formed, for example, by incorporating the slice-image forming function and a program for operating the restoring function in a microcomputer.

The projector portion 34 is for projecting images by forming the slice images from the image signals, and it is necessary to have an imaging speed of 1000-5000 frames per second and sufficient light output. Thus, for example, DMD (Digital Micromirror Device) method projector can be used for the projector portion 34. Moreover, for a light source of a DMD method projector, a type with a laser light source with high light intensity and no limitation in the depth of focus is preferred.

The electronic screens 35 can be formed, for example, by using PNLC (Polymer Network Liquid Crystal). Here, when the electronic screens 35 are in a state where electric voltage is not applied, since liquid crystal molecules are arranged irregularly, lights having entered into the electronic screens 35 from the outside can be scattered about by a liquid crystal layer.

On the other hand, when the electronic screens 35 are in a state where electric voltage is applied, since the liquid crystal molecules are arranged perpendicular to glass surfaces placed on both surfaces of the electronic screens 35, lights having entered into the electronic screens 35 penetrate, enabling the electronic screens 35 to be in a transparent state.

Therefore, each slice image corresponding to the depth value serially displayed by the projector portion 34 can be projected on the electronic screen 35 in the position corresponding to the depth value if a voltage application circuit 38 for separately performing the application and interruption of electric voltage is provided for each electronic screen 35 arranged in a layered state, maximum and minimum depth values are made to correspond to the both end positions of the electronic screens 35 (positions of a first electronic screen 35 and an Sth electronic screen 35) each arranged in a layered state, and an operation control of the voltage application circuit 38 is performed through the driving apparatus 36 based on the output control signals from the display control part 33.

FIG. 1 illustrates a state where electric voltage is applied to the first, second, . . . , i−1th, i+1th, S−1th and Sth electronic screens 35 and not applied to the ith electronic screen 35. Lights are in the scattering state in the ith electronic screen 35, thus if a slice image to be displayed on the ith electronic screen 35 is projected from the projector portion 34, lights forming the slice image penetrate through the first, second, . . . and i−1th electronic screens 35 and become scattered about in the ith electronic screen 35. The scattered lights penetrate through the first, second, . . . , i−1th, i+1th, S−1th and Sth electronic screens 35, which enables the visual confirmation of the slice image projected on the ith electronic screen 35 from the outside.

Additionally, one frame as a volumetric image A is completed by a circuit of a plurality of electronic screens 35 made by a display of a slice image. Also, if the switching of frames is performed at a speed of 50 frames or more per second in the display apparatus 16, as illustrated in FIG. 1, a volumetric model A can be confirmed visually due to the afterimage effect of the eyes.

Moreover, FIG. 1 illustrates a case where a slice image is projected on the plurality of electronic screens 35 of the display apparatus 16 by using one projector portion 34, however, the plurality of electronic screens 35 can be divided into a plurality of levels in the laminating direction, and the projector portions can be arranged on each level for projecting slice images on the plurality of electronic screens 35 belonging on each level. In this case, each projector portion is individually connected to the display control part 33. With this type of structure, the size of the display apparatus can be increased, and a large-sized volumetric image A can be formed.

Next, explanations on a method for forming a volumetric image by using the volumetric-image forming system 10 according to the first embodiment of the present invention will be given.

As illustrated in FIG. 1, when forming a volumetric image B in a free space in the front side of the optical image-forming means 15, a luminous volumetric image A is initially formed inside the display apparatus 16 of the volumetric display apparatus 17 arranged in the back side of the optical image-forming means 15.

When a volumetric image A exists in the back side of the optical image-forming means 15, among lights emitted from the volumetric image A, those having entered from the back side of the optical image-forming means 15 are reflected on the first reflecting surfaces 11, further reflected on the second reflecting surfaces 12 arranged crossing the first reflecting surfaces 11 in planar view and come through to the front side of the optical image-forming means 15. Here, the reflected lights having passed through the optical image-forming means 15 become parallel to incident lights entering from the back side of the optical image-forming means 15. Thus, among the lights radially emitted from a point of the volumetric image A, those reflected on the individually different first and second reflecting surfaces 11 and 12 and passing through the optical image-forming means 15 are focused in a free space in the front side of the optical image-forming means 15, and a volumetric image B is formed in a free space. As a result, the volumetric image A inside the display apparatus 16 becomes the volumetric image B which can be directly touched with hands in a free space.

Additionally, in the optical image-forming means 15, each of the first and second reflecting members 13 and 14 is a double-layered structure. The positions of the first reflecting surfaces 11 arranged in the first reflector 19 are shifted by ½ of the pitch with respect to the positions of the first reflecting surfaces 11 of the first reflector 18, and the positions of the second reflecting surfaces 12 arranged in the second reflector 21 are shifted by ½ of the pitch with respect to the positions of the second reflecting surfaces 12 of the second reflector 20. Thus, when each of the first and second reflecting members 13 and 14 is viewed in planar view, the pitch (spacing) between the first and second reflecting surfaces 11 and 12 can be made ½ of the actual pitch. This, for example, enables each light among those emitted from a point of the volumetric image A with a small difference in the emission angle and each among those emitted from a point adjacent to the volumetric image A to be individually reflected on the first reflecting surfaces 11 of the first reflecting member 13, also enables those reflected lights to be re-reflected on the second reflecting surfaces 12 of the second reflecting member 14 and to become focused in a free space in the front side of the optical image-forming means 15. As a result, the resolution of a volumetric image B becomes enhanced, enabling the visual confirmation of a clear volumetric image B.

Here, if a volumetric image A formed inside the display apparatus 16 is in a resting state (still image), a volumetric image B will be in a resting state (still image), and if a volumetric image A formed inside the display apparatus 16 is in a dynamic state (moving image), a volumetric image B will be in a dynamic state (moving image).

Additionally, electronic data of a volumetric image A can be formed either based on an actual object or by computer graphics. Thus, for example, if electronic data of a specific internal organ are formed based on X-ray CT image data and MRI image data, a volumetric image B of the internal organ can be formed in a free space through a volumetric image A of the internal organ.

Moreover, since the concave-convex relationship of a volumetric image B formed by using the optical image-forming means 15 is the reverse of that of an actual volumetric image A, if electronic data of which the concave-convex relationship of a volumetric image A emitting light inside the display apparatus 16 of the volumetric display apparatus 17 is the reverse of that of the actual volumetric image A are used, the concave-convex relationship of a volumetric image B corresponds to the actual concave-convex relationship of the volumetric image A.

Figure 3:
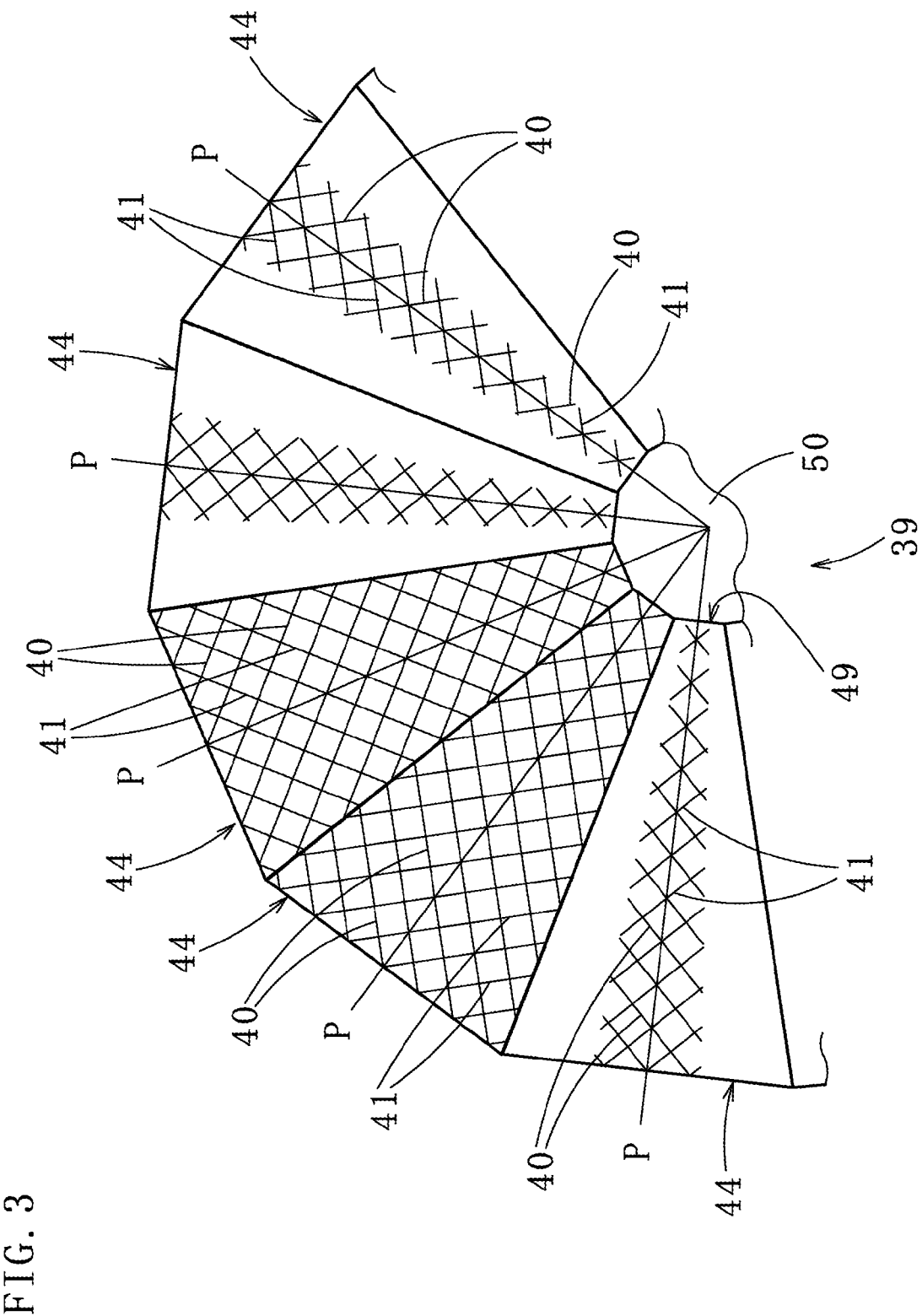
FIG. 3 is a plan view of an optical image-forming apparatus of a volumetric-image forming system according to a second embodiment of the present invention.
Figure 4:
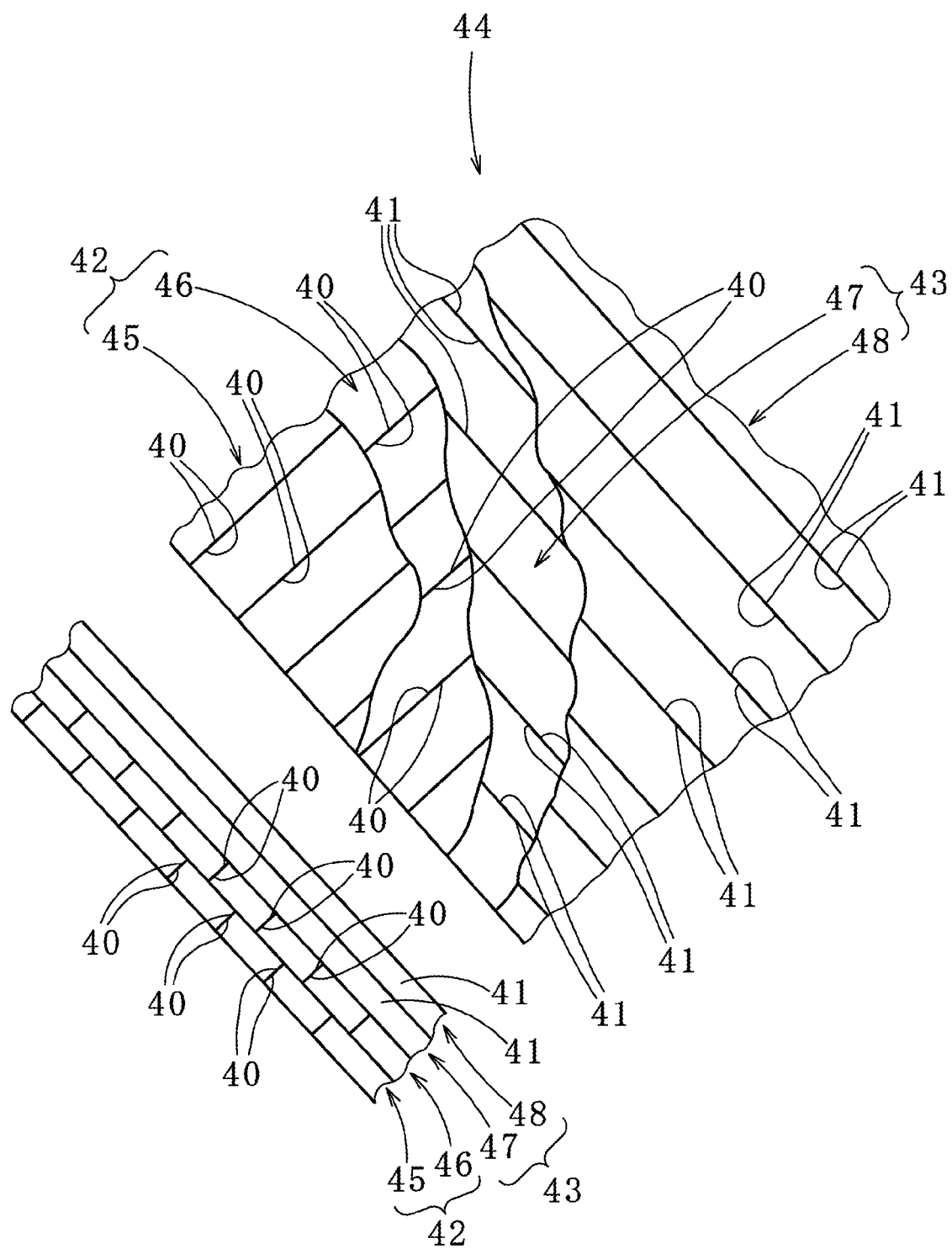
FIG. 4 is an explanatory diagram of an optical image-forming means composing the optical image-forming apparatus of the volumetric-image forming system.

A volumetric-image forming system according to a second embodiment of the present invention, as compared to the volumetric-image forming system 10 according to the first embodiment of the present invention, uses an optical image-forming apparatus 39 illustrated in FIGS. 3 and 4 instead of the optical image-forming means 15. Thus, detailed explanations will be given only on the optical image-forming apparatus 39.

The optical image-forming apparatus 39 comprises light-transmitting and plate-like first and second reflecting members 42 and 43 and a plurality of optical image-forming means 44, the plurality of optical image forming means 44 having the light transmitting and plate-like first and second reflecting members 42 and 43 arranged in direct contact with one another, the first and second reflecting members 42 and 43 respectively having belt-like first and second reflecting surfaces 40 and 41 placed perpendicular to a plate surface and also arranged in parallel at a constant pitch, the first and second reflecting surfaces 40 and 41 arranged at a constant pitch being orthogonal to one another, the plurality of optical image-forming means 44 being positioned on the same surface. Additionally, one of the bisectors of intersection angles where the opposed first and second reflecting surfaces 40 and 41 cross in planar view in the respective optical image-forming means 44 are gathered at one point. Detailed explanations will be given hereinafter.

Moreover, in FIG. 3, in order to define the reflecting surfaces 40 and 41, the reflecting surfaces 40 and 41 of the first and second reflecting members 42 and 43 are individually superimposed.

As illustrated in FIG. 4, the first reflecting member 42 composing the optical image-forming means 44 is a double-layered structure (an example of an N-layered structure) composed of two stacked first reflectors 45 and 46, the first reflecting surfaces 40 are arranged in each of the first reflectors 45 and 46 at a constant pitch, and the positions of the first reflecting surfaces 40 of the first reflector 45 and the first reflecting surfaces 40 of the first reflector 46 are shifted in parallel by just ½ of the pitch between the first reflecting surfaces 40 in planar view. Also, the second reflecting member 43 composing the optical image-forming means 44 is a double-layered structure composed of two stacked second reflectors 47 and 48, the second reflecting surfaces 41 are arranged in each of the second reflectors 47 and 48 at a constant pitch (e.g., the same pitch as that between the first reflecting surfaces 40), and the positions of the second reflecting surfaces 41 of the second reflector 47 and the second reflecting surfaces 41 of the second reflector 48 are shifted in parallel by just ½ of the pitch between the second reflecting surfaces 41 in planar view.

As illustrated in FIG. 3, if the optical image-forming means 44 are, for example, identical trapezoidal shaped, and centerlines P with respect to the opposing oblique sides of the optical image-forming means 44 correspond to one of the bisectors dividing the crossing angles where the first and second reflecting surfaces 40 and 41 cross in planar view into two halves, by arranging T number of optical image-forming means 44 on the same surface with the centerlines P of the optical image-forming means 44 crossed at one point, the optical image-forming apparatus 39 of which the outline is a T-sided regular polygon in planar view can be composed. Also, since a T-sided regular polygonal hole 49 in which the first and second reflecting surfaces 40 and 41 do not exist is formed in the central part (region centered on a point where the centerlines P of the respective optical image-forming means cross) of the optical image-forming apparatus 39, a tabular light-shielding portion 50 is embedded into this hole 49, and a volumetric image A (not illustrated) is arranged in the back side of the light-shielding portion 50. By providing the light-shielding portion 50, among lights from a volumetric image A, those reflected on neither the first reflecting surfaces 40 nor the second reflecting surfaces 41 and passing through the optical image-forming apparatus 39 (non-reflected passing lights) can be shielded. Moreover, among the lights from the volumetric image A, those entering into the optical image-forming apparatus 39 at small incident angles, reflected only once on any one of the first reflecting surfaces 40 and the second reflecting surfaces 41 and passing though the optical image-forming apparatus 39 can also be shielded effectively. This can prevent a mirror image of a volumetric image A reflected on the first and second reflecting surfaces 40 and 41 from appearing as a ghost or noise with respect to a volumetric image B.

Furthermore, T is, for example, an integer ranging from 4 to 100. The larger the T is, the more the percentage of the first and second reflecting surfaces 40 and 41 on the centerlines P with respect to the first and second reflecting surfaces 40 and 41 included in the optical image-forming means 44 becomes increased. An increase in the percentage of the first and second reflecting surfaces 40 and 41 on the centerlines P relatively increases the percentage of lights reflected only once each on both of the first and second reflecting surfaces 40 and 41 and passing through the optical image-forming apparatus 39 (relatively decreases the percentage of lights reflected only once on any one of the first reflecting surfaces 40 and the second reflecting surfaces 41 and passing through the optical image-forming apparatus 39), which increases the brightness of a real image and also suppresses the appearance of a mirror image of a volumetric image A.

The optical image-forming means 44 are trapezoidal shaped, and the optical image-forming apparatus 39 is provided with the T-sided regular polygonal hole 49 in the central part and has the T-sided regular polygonal outline. However, after forming the optical image-forming apparatus 39, the outer circumference can be reshaped into, for example, a circle or square. Additionally, after forming the optical image-forming apparatus 39, the T-sided regular polygonal hole 49 can be converted to a circular hole by processing the marginal part of the hole 49.

Also, in the second embodiment, the first reflecting member 42 is a double-layered structure composed of two stacked first reflectors 45 and 46, and the second reflecting member 43 is a double-layered structure composed of two stacked second reflectors 47 and 48. However, the first and second reflecting members can also be composed of one first reflector and one second reflector, respectively.

Moreover, each of the first and second reflecting members can be, for example, an N-layered structure of 3 or more but 10 or less layers. Furthermore, when the first and second reflecting members are N-layered structures, each of the first and second reflecting members must be arranged with the positions of the first and second reflecting surfaces adjacent in planar view shifted by 1/N of a pitch.

With this type of structure, a pitch between the first reflecting surfaces and between the second reflecting surfaces in the planarly-viewed first and second reflecting members become 1/N of a pitch between the first and second reflecting surfaces, enabling the obtainment of volumetric images with further enhanced resolution.

A method for forming a volumetric image by using the volumetric image-forming system according to the second embodiment of the present invention is the same as the method for forming a volumetric image by using the volumetric-image forming system 10 according to the first embodiment, and thus, explanations will be omitted.

Figure 5:
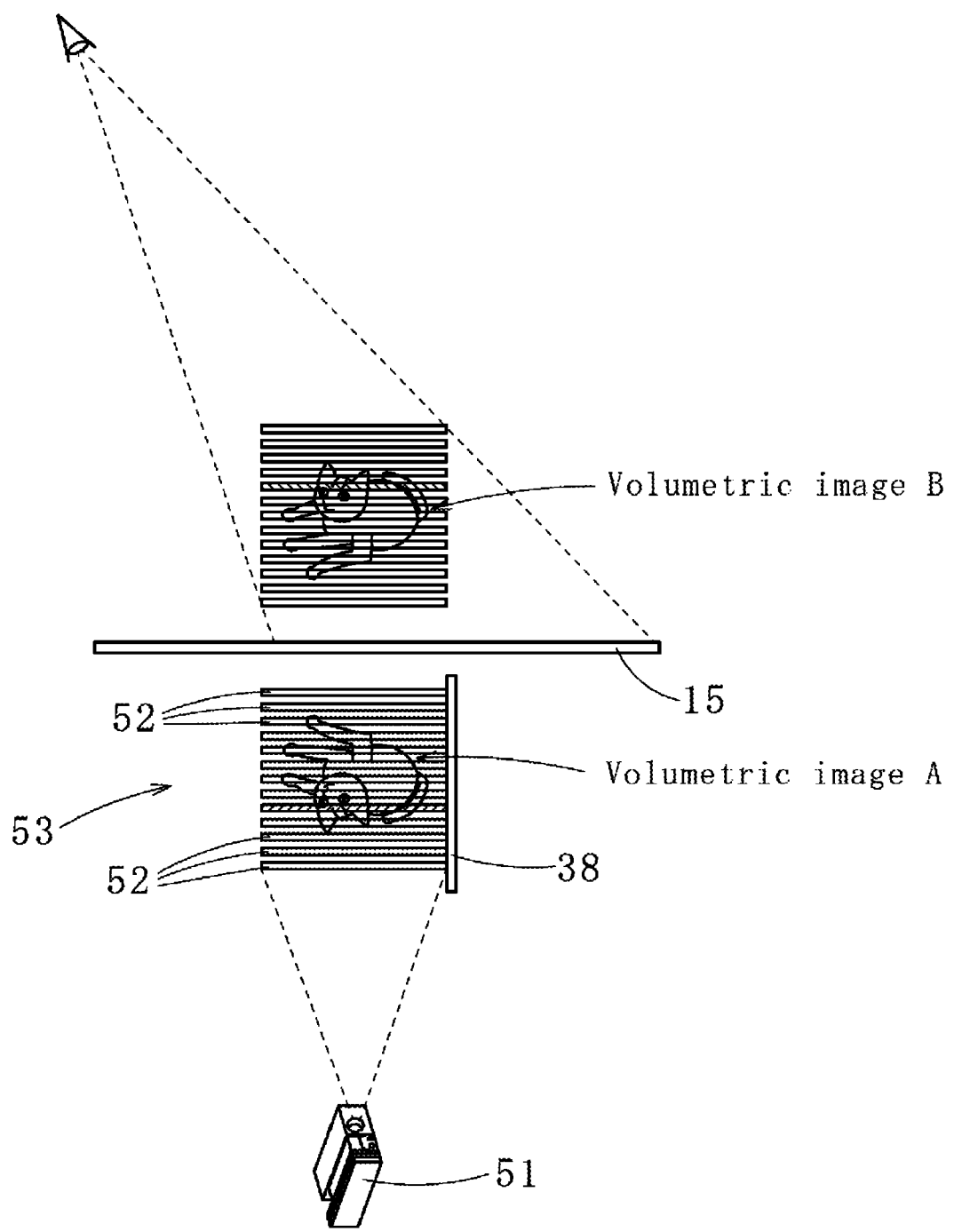
FIG. 5 is an explanatory diagram illustrating the locations of an optical image-forming means and electronic screens in a volumetric-image forming system according to a third embodiment of the present invention.

A volumetric-image forming system according to a third embodiment of the present invention, as compared to the volumetric-image forming system 10 according to the first embodiment of the present invention, as illustrated in FIG. 5, comprises a projector portion 51, an optical image forming means 15, electronic screens 52 and a display apparatus 53, the projector portion 51 being arranged so that the projection direction of the projector portion 51 of a volumetric display apparatus becomes perpendicular to the optical image-forming means 15, the display apparatus 53 being arranged in between the projector portion 51 and the optical image-forming means 15, the display apparatus 53 being provided the with electronic screens 52 each arranged parallel to the optical image-forming means 15. Additionally, a function of the volumetric display apparatus of the volumetric-image forming system according to the third embodiment is similar to that of the volumetric display apparatus 17 of the volumetric-image forming system 10, and thus the same component members will be indicated by the same signs, and detailed explanations will be omitted.

Since each electronic screen 52 is arranged parallel to the optical image-forming means 15, lights emitted from a volumetric image A formed inside the display apparatus 53 can effectively be made to enter into the optical image-forming means 15, and by using the optical image-forming means 15, a bright and clear volumetric image B can be formed.

Figure 6:
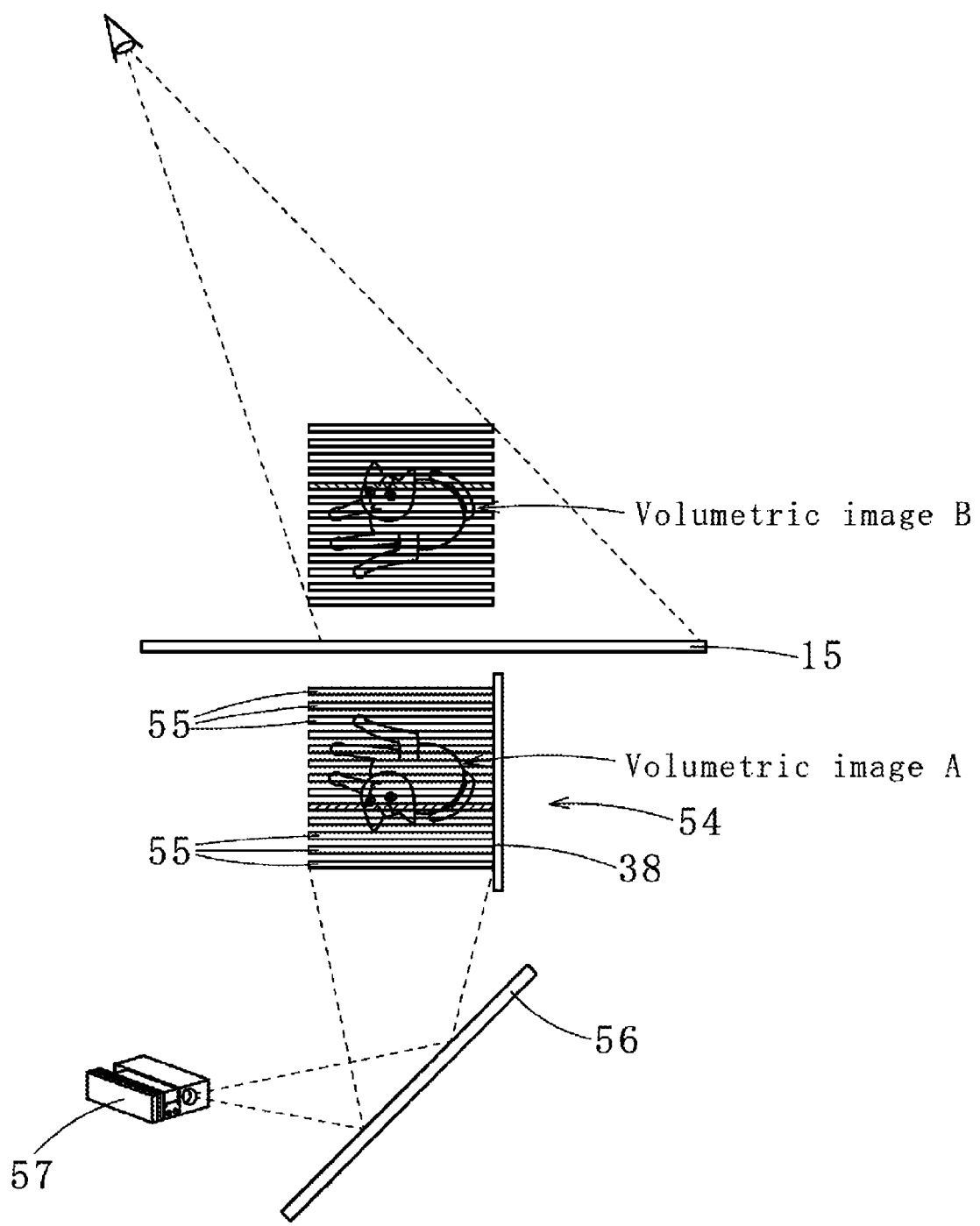
FIG. 6 is an explanatory diagram illustrating the locations of an optical image-forming means and electronic screens in a volumetric-image forming system according to a fourth embodiment of the present invention.

A volumetric-image forming system according to a fourth embodiment of the present invention, as compared to the volumetric-image forming system 10 according to the first embodiment of the present invention, as illustrated in FIG. 6, comprises a volumetric display apparatus arranged in the back side of an optical image-forming means 15, the volumetric display apparatus having a display apparatus 54, electronic screens 55, an optical image-forming means 15, a mirror 56 and a projector portion 57, the electronic screens 55 of the display apparatus 54 each being arranged parallel to the optical image-forming means 15, the mirror 56 being tilted at 45 degrees to the lamination direction of the electronic screens 55 and arranged in the back side of the display apparatus 54, the projector portion 57 being arranged with the projection direction thereof tilted at 45 degrees to the mirror 56.

Additionally, a function of the volumetric display apparatus of the volumetric-image forming system according to the fourth embodiment is similar to that of the volumetric display apparatus 17 of the volumetric-image forming system 10, and thus, the same component members will be indicated by the same signs, and detailed explanations will be omitted.

With this type of structure, slice images projected by the projector portion 57 can be made to reflect on the mirror 56 and enter from the direction perpendicular to the electronic screens 55. Also, since each electronic screen 55 is arranged parallel to the optical image-forming means 15, lights emitted from a volumetric image A formed inside the display apparatus 54 can be made to effectively enter into the optical image-forming means 15, and by using the optical image-forming means 15, a bright and clear volumetric image B can be formed.

Moreover, since the projector portion 57 is not arranged in the back side of the display apparatus 54, the volumetric display apparatus can be compact, and the structure of the volumetric-image forming system can be compact as well.

A volumetric-image forming system according to a fifth embodiment of the present invention, as compared to the volumetric-image forming system according to the second embodiment of the present invention, uses the volumetric display apparatus of the volumetric-image forming system according to the third embodiment as a volumetric display apparatus. Also, a volumetric-image forming system according to a sixth embodiment of the present invention, as compared to the volumetric-image forming system according to the second embodiment of the present invention, uses the volumetric display apparatus of the volumetric-image forming system according to the fourth embodiment as a volumetric display apparatus.

Thus, the structures of the volumetric display apparatuses of the volumetric-image forming systems according to the fifth and sixth embodiments are similar to those of the volumetric display apparatuses of the volumetric-image forming systems according to the third and fourth embodiments, respectively, and function thereof are also similar to that of the volumetric display apparatus 17 of the volumetric-image forming system 10. Therefore, detailed explanations will be omitted. Moreover, functions of the volumetric-image forming systems and methods for forming a volumetric image according to the fifth and sixth embodiments are similar to those of the volumetric-image forming system according to the second embodiment as well, and thus, detailed explanations will be omitted.

The explanations on the present inventions have been given hereinbefore with reference to the embodiments, however, the present invention is not limited to the structures described in the above embodiments, and includes other embodiments and variations which can be considered within the scope of matters disclosed in the claims.

Moreover, the present invention includes the combinations of composing elements each included in the present embodiments and other embodiments and variations.

For example, the light-transmitting and plate-like first and second reflecting members are arranged in direct contact with each other, however, they can also be arranged in proximity. Here, it is preferred that the distance between first and second reflecting members arranged in proximity be within the range of twice the thickness of the first and second reflecting members. Additionally, if the distance between the first and second reflecting members exceeds more than twice the thickness of the first and second reflecting members, the distance between a reflecting point on the first reflecting member and a reflecting point on the second reflecting member, both of which reflecting incident light rays entering into a panel (optical image-forming means), becomes twice the thickness or more of the first and second reflecting members, and a misalignment among reflected light rays contributing to the image formation at an imaging point after being reflected twice in total, once on each of the first and second reflecting members, proportionately becomes greater. This lowers the resolution at an imaging area and thus it is not preferable.

INDUSTRIAL APPLICABILITY

A volumetric image created from electronic data can be displayed in a free space without using an actual image. Therefore, people can touch the created volumetric image, and it will be usable not only in the advertising field, but also in the engineering field to display the contents of complicated mechanical structures, etc., and in the medical field for the explanation of human tissues by using volumetric images, etc.

REFERENCE SIGNS LIST

10: volumetric-image forming system, 11: first reflecting surface, 12: second reflecting surface, 13: first reflecting member, 14: second reflecting member, 15: optical image-forming means, 16: display apparatus, 17: volumetric display apparatus, 18, 19: first reflector, 20, 21: second reflector, 22: light entrance portion, 23, 24, 25: light entrance/exit portion, 26: light exit portion, 27: light entrance portion, 28, 29, 30: light entrance/exit portion, 31: light exit portion, 32: image source, 33: display control part, 34: projector portion, 35: electronic screen, 36: driving apparatus, 37: display portion, 38: voltage application circuit, 39: optical image-forming apparatus, 40: first reflecting surface, 41: second reflecting surface, 42: first reflecting member, 43: second reflecting member, 44: optical image-forming means, 45, 46: first reflector, 47, 48: second reflector, 49: hole, 50: light-shielding portion, 51: projector portion, 52: electronic screen, 53: display apparatus, 54: display apparatus, 55: electronic screen, 56: mirror, 57: projector portion

The invention claimed is:
1. A volumetric-image forming system, comprising:
   an optical image-forming means, the optical image-forming means comprising:
      a light-transmitting and plate-like first reflecting member, the first reflecting member having first reflecting surfaces arranged perpendicular to a plate surface of the first reflecting member and also arranged in parallel at a constant pitch; and
      a light-transmitting and plate-like second reflecting member arranged closely or in direct contact with the first reflecting member and arranged on a level that is different from the level of the plate-like first reflecting member, the second reflecting member having second reflecting surfaces arranged perpendicular to a plate surface of the second reflecting member and also arranged in parallel at a constant pitch,
      wherein the first reflecting surfaces and the second reflecting surfaces are arranged crossing one another in a planar view; and
   a volumetric display apparatus arranged in the back side of the optical image-forming means and displaying a luminous volumetric image A in a resting or dynamic state inside a display apparatus from electronic data, wherein the volumetric display apparatus comprises:
      a projector portion and the display apparatus, the projector portion projecting images by transforming image signals formed from electronic data into images, the display apparatus having electronic screens displaying the images and arranged in the projection direction of the images with a distance between each electronic screen, the electronic screens electronically controlling light to select the state of light between transmitting state and scattering state,
   wherein an image of the volumetric image A inside the display apparatus is formed as a volumetric image B in a free space in the front side of the optical image-forming means, and
   wherein each of the first reflecting member and second reflecting member is an N-layered structure composed of two or more layers,
   wherein the positions of adjacent first reflecting surfaces of the N-layered first reflecting member when viewed in a planar view are shifted by 1/N of the constant pitch of the first reflecting surfaces; and
   wherein the positions of adjacent second reflecting surfaces of the N-layered second reflecting member when viewed in a planar view are shifted by 1/N of the constant pitch of the second reflecting surfaces.
2. The volumetric-image forming system as set forth in claim 1, wherein
   the volumetric display apparatus is arranged in a direction parallel or orthogonal to the optical image-forming means.
3. A method for forming a volumetric image, comprising the steps of:
   providing an optical image-forming means with a light-transmitting and plate-like first reflecting member, the first reflecting member having first reflecting surfaces arranged perpendicular to a plate surface of the first reflecting member and also arranged in parallel at a constant pitch;
   providing the optical image-forming means with a light-transmitting and plate-like second reflecting member arranged closely or in direct contact with the first reflecting member and arranged on a level that is different from the level of the plate-like first reflecting member, the second reflecting member having second reflecting surfaces arranged perpendicular to a plate surface of the second reflecting member and also arranged in parallel at a constant pitch, wherein the first reflecting surfaces and the second reflecting surfaces are arranged crossing one another in a planar view; and
   arranging a volumetric display apparatus in the back side of the optical image-forming means, the volumetric display apparatus displaying a luminous volumetric image A in a resting or dynamic state inside a display apparatus from electronic data, the volumetric display apparatus comprising a projector portion and the display apparatus, the projector portion projecting images by transforming image signals formed from electronic data into images, the display apparatus having electronic screens displaying the images and arranged in the projection direction of the images with a distance between each electronic screen, the electronic screens electronically controlling light to select the state of light between transmitting state and scattering state,
   wherein the volumetric image A inside the display apparatus is formed as a volumetric image B in a free space in the front side of the optical image-forming apparatus, and
   wherein each of the first reflecting member and second reflecting member is an N-layered structure composed of two or more layers,
   wherein the positions of adjacent first reflecting surfaces of the N-layered first reflecting member when viewed in a planar view are shifted by 1/N of the constant pitch of the first reflecting surfaces, and wherein the positions of adjacent second reflecting surfaces of the N-layered second reflecting member when viewed in a planar view are shifted by 1/N of the constant pitch of the second reflecting surfaces.

* * * * *